US005453584A

United States Patent [19]

Borello

[11] Patent Number: 5,453,584

[45] Date of Patent: Sep. 26, 1995

[54] ACOUSTIC INSULATION SCREEN AND ITS APPLICATIONS, PARTICULARLY FOR PROTECTING THE PAYLOAD COMPARTMENT OF A SPACE LAUNCHER

[75] Inventor: Gérard Borello, L'Union, France

[73] Assignee: Centre National d'Etudes Spaciales, Paris, France

[21] Appl. No.: 269,965

[22] Filed: Jun. 30, 1994

Related U.S. Application Data

[63] Continuation of Ser. No. 688,523, Jun. 5, 1991, abandoned.

[30] Foreign Application Priority Data

Oct. 6, 1989 [FR] France .................................. 89 13099

[51] Int. Cl.$^{6}$ .................................................... F16F 15/00

[52] U.S. Cl. .......................... 181/207; 181/208; 181/296

[58] Field of Search .................................... 181/202–205, 181/207, 208, 286, 294, 295, 296; 138/26, 30

[56] References Cited

U.S. PATENT DOCUMENTS 2,731,606 1/1956 Stewart et al. .......................... 181/202

4,523,612 6/1985 Kuklo ................................ 181/208 X

FOREIGN PATENT DOCUMENTS 2490854 3/1982 France .

8002580 11/1980 WIPO .

OTHER PUBLICATIONS

Institute of Aeronautics and Astronautics, Inc., 1985, J. C. Blevins et al., "Use of helium gas to reduce acoustic transmission", pp. 96–101.

*Primary Examiner*—Khanh Dang

*Attorney, Agent, or Firm*—Blakely, Sokoloff, Taylor & Zafman

[57] ABSTRACT

The invention relates to an acoustic insulation screen. The screen comprises a cushion (5) consisting of a flexible bag (4) inflated with a gas under pressure and allowing the gas to flow freely inside the bag, said bag being selected so as not to transmit vibration energy from one point of the bag to another, and the gas being selected from gases in which the speed of sound is greater than the speed of sound in the air. The invention applies particularly to the protection of the payload compartment in a launcher.

2 Claims, 2 Drawing Sheets

ACOUSTIC INSULATION SCREEN AND ITS APPLICATIONS, PARTICULARLY FOR PROTECTING THE PAYLOAD COMPARTMENT OF A SPACE LAUNCHER

This is a continuation of application Ser. No. 07/688,523 filed Jun. 5, 1991 now abandoned.

The present invention relates to a screen for reducing noise level.

It relates in particular to reducing noise in the compartment of a launcher that contains the payload, and particularly in the low frequency range, i.e. typically frequencies below 200 Hz.

A known method of reducing the noise in the payload compartment of a launcher consists of filling said compartment with a gas such as helium, as described for example in the article "Use of helium gas to reduce acoustic transmission" by James G. Belvins et al. (American Institute of Aeronautics and Astronautics, Inc., 1985, p. 96–101).

This particularly expensive method is effective over a wide frequency spectrum, but modifications to the payload-to-cavity coupling make payload qualification difficult, and cause problems of vibration at the first acoustic mode frequencies of the helium cavity. Moreover, the helium may diffuse into the vacuum tubes of the electronic components.

Another proposal has been made to design the wall of the shell of the payload compartment as a double wall and to fill the gap between the two walls with helium. This method is effective at high frequencies, but is not very effective at low frequencies, and it gives rise to problems with solid transmission via the points at which the two walls are attached together.

The present invention proposes a different method of reducing the noise level through a wall by using a screen consisting of a flexible bag inflated with a gas under pressure and allowing the gas to flow freely inside the bag, said bag being selected so as not to transmit vibration energy from one point of the bag to another, and said gas being selected from gases in which the speed of sound is greater than the speed of sound in air.

The word "gas" means a gas or a mixture of gases.

Typically, such a bag is naturally "flexible", i.e. non-rigid in contrast with a rigid body; for example, a metallized bag made of Mylar polyester film or polyvinyl chloride could be used.

The most suitable gas is helium, as in the methods recalled above. It is used pure or in a mixture. As a variant, freon is used. These examples are not limiting: any gas with a density lower than that of air and with a high enough ratio of density to propagation speed is suitable. Hydrogen could be used, but it is too dangerous. The thickness of the cushion is not critical. For example, for a cushion 4 cm thick mounted on a cylinder having a diameter of 1 meter (m), an attenuation of 10 dB is obtained in the range 1 kHz to 2 kHz and above. By increasing the thickness to 20 cm the effectiveness at low frequencies can be improved. In practice, the thickness of the cushion should preferably be not less than 5% of the largest dimension of the cushion.

The inflation pressure is not critical provided that it is enough to make the bag take its cushion shape without being stretched too much. If the bag is too stretched, acoustic energy could be caused to propagate in the membrane which constitutes the bag.

A pressure of the order of 1 bar is generally suitable.

The total mass of the screen is very small, about 30 kg for an area of approximately 100 $m^2$. In the application of the invention to the wall of the payload compartment of a launcher, where the cushion is preferably placed outside the wall, this makes it possible to jettison the cushion after about ten seconds, which corresponds to an altitude of several tens of meters, since the acoustic protection is useful mainly in this critical very first stage of blast-off.

The acoustic effectiveness presents a maximum of about 10 to 12 dB with diffused-type acoustic noise.

When noise reaches the bag at a certain angle of incidence, the effectiveness of 12 dB for an incidence perpendicular to the bag increases up to an incidence of 20° relative to the perpendicular and, beyond 20°, the attenuation is theoretically total, since the incident wave is theoretically fully reflected, but in practice this attenuation is limited by the evanescent pressure which arises from the forced movement of the membrane. To avoid the effect of evanescent pressure and to have the advantages of good acoustic insulation, it is preferable for the cushion to be at least 1 cm thick.

By retaining the inside air around the payload, the invention makes it possible to keep the same qualification philosophy. In particular the elastoacoustic coupling between the air and the satellites is the same and thus any noise reduction measured in the cavity gives rise to a similar reduction in satellite vibration. Furthermore, the vibration of the launcher structure is attenuated in the same way.

Figure 1:
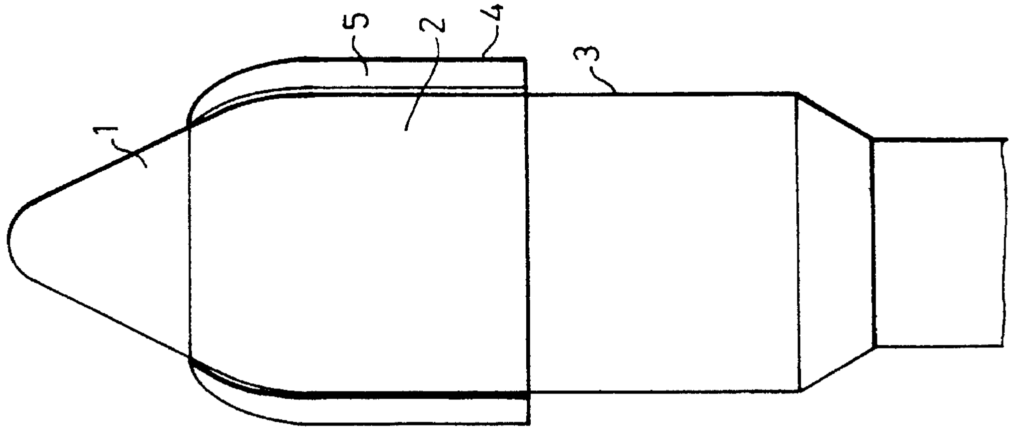
FIG. 1 is a theoretical view of the payload compartment of a launcher equipped with an acoustic protection screen of the invention.

FIG. 1 is a diagram showing the part of a launcher 1 which includes the payload compartment 2 and on the shell 3 of which a membrane 4 is secured; said membrane is made of metallized Mylar polyester film and constitutes a bag which is inflated with helium until the thickness of the resulting cushion 5 is approximately 20 cm. The bag is secured to the shell by any appropriate means, for example by gluing or lacing.

The helium bag is inflated a few hours before blast-off and if the bag is not sufficiently gastight this inflation is continued until blast-off.

Figure 2:
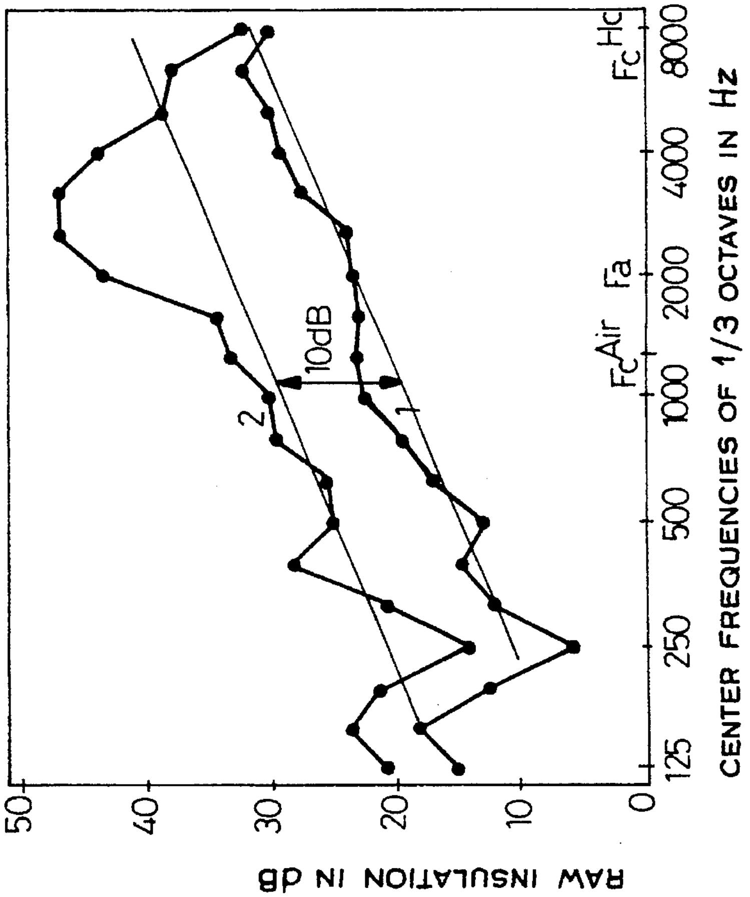
FIG. 2 is a curve showing the effectiveness of said screen.

FIG. 2 shows the curve of the raw insulation (in dB) plotted up the Y-axis as a function of the center frequencies of third-octaves (in Hz), plotted along the X-axis in response to white noise excitation, for air (curve C1) and for a cushion of the invention (curve C2).

It can be seen that an average improvement of about 10 dB is obtained.

Figure 3:
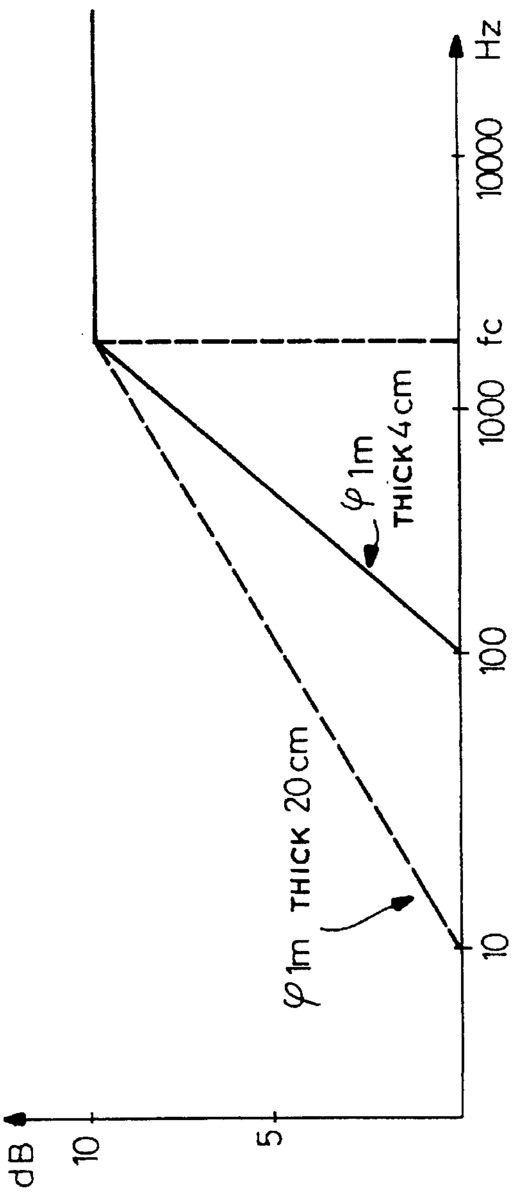
FIG. 3 is a graph showing the influence of cushion thickness on acoustic attenuation.

FIG. 3 shows the influence of the thickness of the cushion on noise reduction: the solid-line curve relates to a cushion which is 4 cm thick and 1 m in diameter, and the dashed-line curve relates to a cushion which is 20 cm thick and 1 m in diameter.

The frequencies (Hz) of the incident diffused noise are plotted along the X-axis and the noise reduction (in dB) is plotted up the Y-axis.

The invention is not limited to the embodiment or to the application described above.

Figure 4:
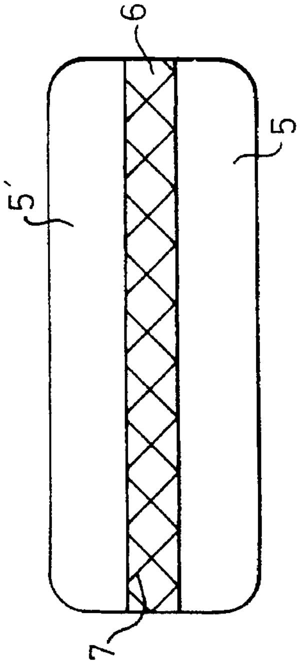
FIG. 4 is a diagrammatic section showing a variant embodiment.

For example, in variant embodiment (FIG. 4), the screen consisting of two cushions 5 and 5' placed one on top of the other and separated by an intermediate layer of air, and optionally filled with foam 7 or other materials suitable for improving effectiveness at high frequencies.

Figure 5:
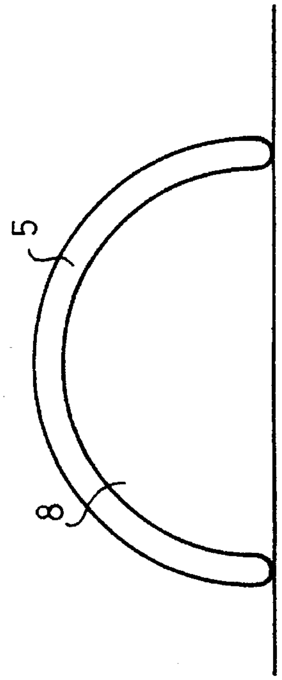
FIG. 5 is a diagrammatic section of a cushion used to isolate premises.

The cushion of the invention can also be used in various other applications, for example to insulate a chamber or a premises, and for this purpose it can take any desired shape. FIG. 5 shows, as an example, a dome-shaped cushion 5 of the invention for acoustically insulating a chamber 8.

I claim:

1. A method for passively attenuating transmission of acoustic vibration through a rigid wall of a payload compartment of a rocket launcher, the acoustic vibration being generated in the atmosphere outside the rocket launcher during launching of the rocket launcher, the method comprising:

providing at least a first inflatable bag made of a membrane, the membrane comprising a material selected from the group consisting of mylar polyester film and polyvinyl chloride;

securing the first inflatable bag to the wall of the payload compartment so as to surround the payload compartment, the first inflatable bag being detachable from the wall so that the first inflatable bag can be jettisoned during flight; and inflating the first inflatable bag with a gas selected from the group consisting of helium and freon, the first inflated bag having a thickness lying in a range between four and twenty centimeters.

2. The method according to claim 1, wherein the step of providing at least a first inflatable bag made of a membrane, the membrane comprising a material selected from the group consisting of mylar polyester film and polyvinyl chloride further comprises the step of securing a second inflatable bag on top of the first inflatable bag so as to form an intermediate cavity layer between the first and second inflatable bags, the second inflatable bag made of a membrane comprising a material selected from the group consisting of mylar polyester film and polyvinyl chloride and being filled with a gas selected from the group consisting of helium and freon, the intermediate cavity layer being filled with a filler selected from the group consisting of air and foam.

* * * * *